United States Patent [19]

Selgin

[11] 4,218,525
[45] Aug. 19, 1980

[54] RESERVE TYPE BATTERY

[75] Inventor: Paul J. Selgin, Washington, D.C.

[73] Assignee: The United States of America as represented by the Secretary of the Army, Washington, D.C.

[21] Appl. No.: 116,882

[22] Filed: Sep. 21, 1949

[51] Int. Cl.² ............................................. H01M 6/38
[52] U.S. Cl. .................................. 429/114; 102/19.2; 102/203
[58] Field of Search ............. 136/90; 102/18 M, 19.2, 102/203; 429/52, 110, 114, 115

[56] References Cited

U.S. PATENT DOCUMENTS

| | | | |
|---|---|---|---|
| 2,898,394 | 8/1959 | Williams | 429/114 |
| 2,901,525 | 8/1959 | Everett | 429/114 |
| 2,918,514 | 12/1959 | Everett | 429/114 |
| 2,918,516 | 12/1959 | Everett | 429/114 |
| 2,921,974 | 1/1960 | Mott-Smith | 429/114 |
| 2,931,848 | 4/1960 | Burrell | 429/114 |

*Primary Examiner*—Leland A. Sebastien
*Attorney, Agent, or Firm*—Nathan Edelberg; Robert P. Gibson

EXEMPLARY CLAIM

1. A reserve battery comprising a cell, spaced electrodes in said cell, a filling aperture in said cell, a frangible sealed ampule containing electrolyte, a plunger adjacent said ampule, a conduit between said ampule and said cell aperture, a body of sealing material, and means for moving said plunger into contact with said ampule to crush same and force electrolyte through said conduit and aperture into said cell, said means being so constructed and arranged that upon further motion of said plunger the body of sealing material is disposed across the aperture to seal same.

2 Claims, 5 Drawing Figures

RESERVE TYPE BATTERY

This invention relates to reserve type batteries, that is, electric batteries which do not become activated until it is desired to put them into service, and has particular reference to a reserve battery for an electric fuse for use with unrotated ordnance.

Reserve type batteries are known which are activated by crushing a vial containing fluid electrolyte so that the electrolyte can come in contact with the plate elements and thus be activated and ready for service. Such batteries have been found useful in electric fuses for rotated ordnance, where the shock of setback upon firing is used to crush the vial, and where the centrifugal force of spin of the projectile due to its rotation (acquired from the rifling of the firing gun) makes possible the rapid and uniform filling of the battery cells. For unrotated ordnance such as rockets or mortars, the problem of rapid and uniform filling becomes more acute. The force of setback may be used to crush the vial, but the duration of this force is too brief to be useful in filling the cells properly. The force of gravity is also unreliable, due to the relative weakness of this force, and because the projectile is fired at various angles.

Since it is desired to arm the fused projectile very rapidly, it is necessary that the battery be activated and in a stable operating condition (to assure adequate and uniform voltage supply) in a very short time, usually in the order of 1/10 second. This requirement also precludes reliance on gravity to properly distribute the electrolyte.

It is an object of my invention to overcome the above stated difficulties in providing a reserve type battery for nonrotating ordnance missiles. The reserve type battery, as is well known, is employed because it has practically indefinite shelf life and therefore can be stored for indefinite periods and still be ready for instant use when the missile is discharged.

I achieve the above and other objects by the use of a plunger, actuated by gas or spring pressure or otherwise upon discharge of the missile to crush a vial containing the electrolyte and to force the same under great pressure into the cells of the battery, thus activating the battery. A seal of plastic material, also actuated by the motion of the plunger, is then pressed against the openings through which the fluid electrolyte has entered, so as to seal each cell off from the others, thus preventing short-circuiting of the battery. A strainer may be used to prevent the crushed glass particles from the vial from unduly interfering with proper flow of the fluid.

The specific nature of the invention, as well as other objects and advantages thereof will clearly appear from the description of preferred embodiments as shown in the accompanying drawings, in which, FIG. 1 is a longitudinal section of a battery embodying my invention.

Figure 1:
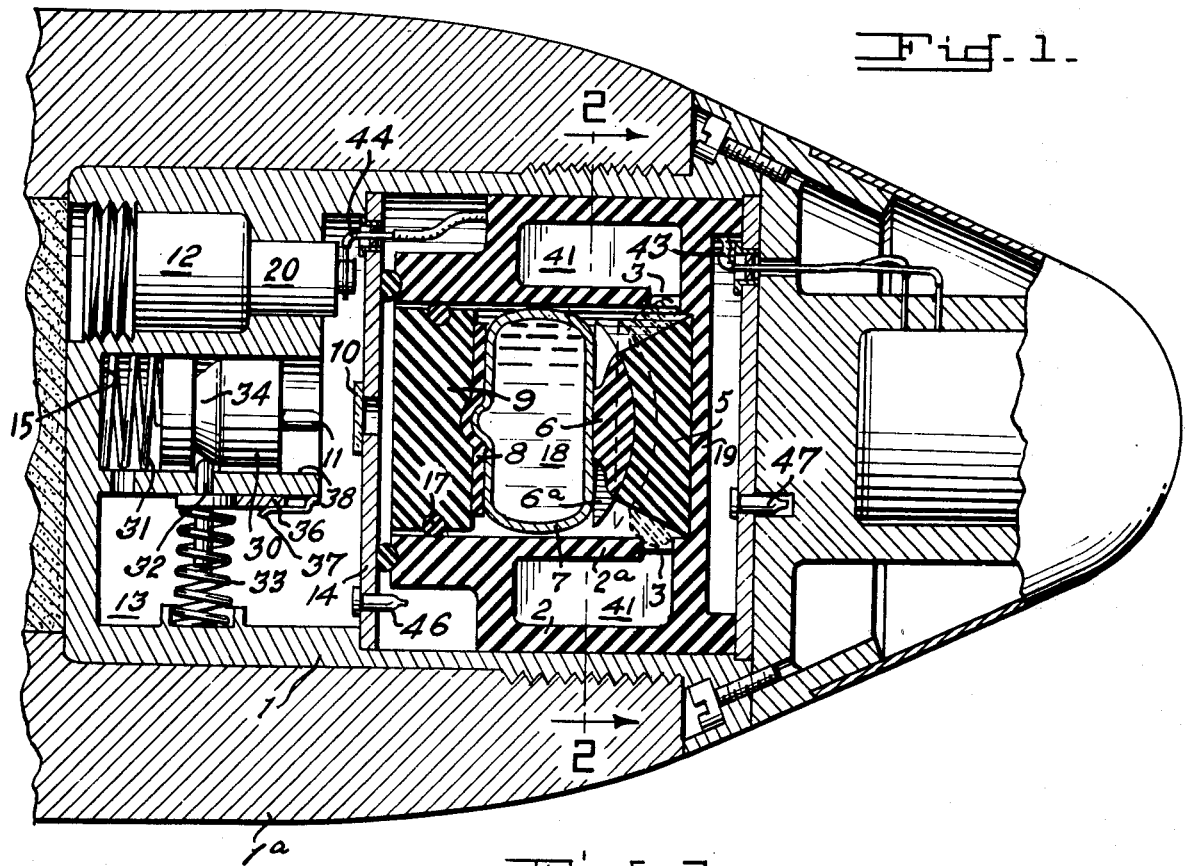
Figure 2:
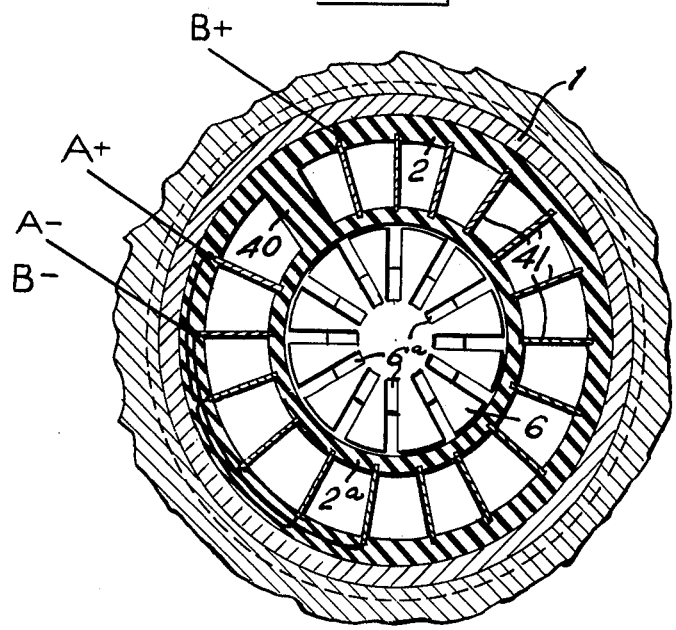
FIG. 2 is a cross section view taken on line 2—2 of FIG. 1.

Percussion pin 11 is mounted on a small inertia member 30 which is biased downward, as seen in FIG. 1, by spring 31. Detent pin 32 is biased by spring 33 into circumferential groove 34 in member 30, so as to hold inertia member 30 against axial displacement toward the point of the projectile, and to restrain it against displacement to the rear unless the force is sufficiently great to push pin 32 out of the groove 34 by camming action of the inclined face of the groove. If the force is of instant duration only, even if it is great enough to displace the pin 32 from the groove, no harm will be done, because immediately thereafter spring 31 will return inertia member 30 to its initial position, and spring 33 will force pin 32 back into the groove. This is all that can happen, for example, if the fuse (or missile) is inadvertently dropped on a hard surface, because the force developed, no matter how great it is, will be of instant duration only. However, when the missile is discharged, in the case of a rocket and even in the case of a mortar, the missile accelerates for some distance, and the period of setback is therefore sustained for a substantial fraction of a second. Therefore, not only will the aforedescribed action occur, but also, while pin 32 is in the pushed-back position, slug 36, which is restrained so that it can slide longitudinally against friction by spring 37, still has sufficient setback force acting upon it so that it slides under the head of pin 32 and prevents the pin from returning. As soon as the setback force subsides, inertia member is free to be driven by its spring 31 to the end of the bore 38, where it shatters window 10 between the two chambers of the housing.

Separator 40 separates the ends of the battery of opposite polarity, the cells being in series for the B portion of the battery, and conduction being through the plates 41, which are all alike, and are coated differently on opposite sides to provide the poles or electrodes. Any suitable electrode material may be employed, and suitable electrolyte, but I have found nickel plates coated on one side with $PbO_2$ (lead dioxide) and on the other side with pure lead (Pb), to be satisfactory, with fluoboric acid as the electrolyte. The last few cells on the positive end of the battery are shown connected in parallel instead of the series arrangement described. This is for the purpose of providing on A supply of suitable capacity by increasing the effective plate area, in known fashion. The A- pole and the B- pole may be common, as shown, or any suitable known arrangement may be used. The pole leads may be brought out to any suitable terminals shown by way of example at 43 and 44 (FIG. 1) for the B supply leads.

Sealing nipples 46 and 47 are shown to indicate that the two chambers of the battery are sealed off at different pressures, the upper chamber being sealed at about 100 pounds pressure, and the lower chamber being evacuated, so that the maximum pressure differential is obtained, whereby plunger 9 is moved with considerable speed and force once window 10 is broken. It will be apparent, however, that other means than gas pressure could be used to bias the plunger into operative position, such as a spring normally restrained by a catch and released by the action of the inertia member 11. It will also be apparent that instead of the setback release shown, any suitable known time-delay means could be used to activate the plunger 50, or any other known form of safety device could be used.

Figure 3:
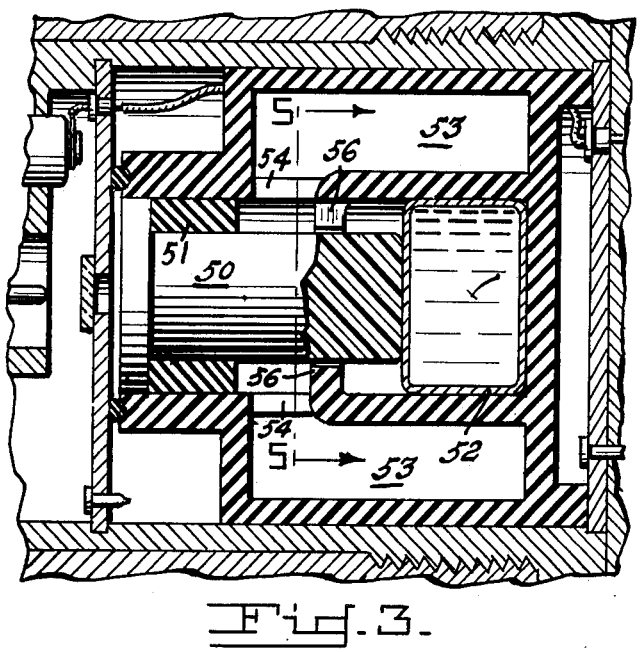
FIG. 3 is a longitudinal section view of another form of my invention.
Figure 4:
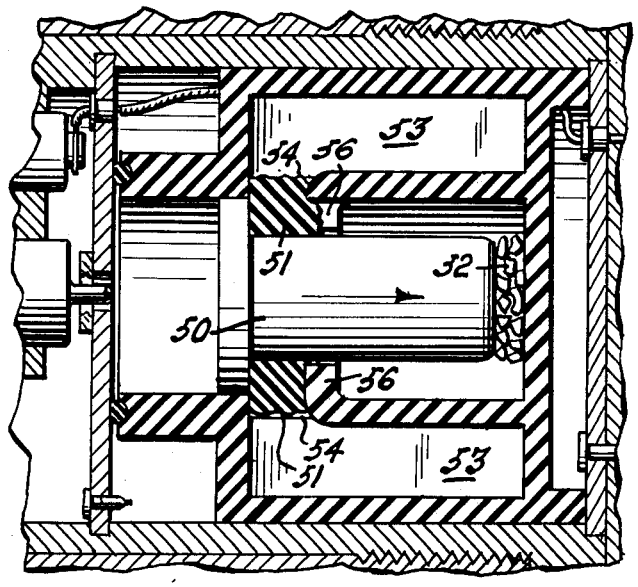
FIG. 4 shows the device of FIG. 5 in actuated condition.
Figure 5:
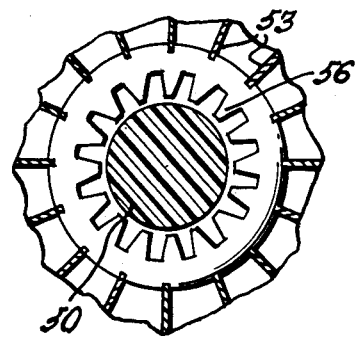
FIG. 5 is a cross section taken on line 5—5 of FIG. 3.

FIG. 3 shows a modified form of my battery which reduces the likelihood of stray glass particles from the crushed vial getting into the battery or interfering with its proper filling and sealing. The upper chamber may be the same as previously described. The plunger 50 is provided near its upper end with a sealing collar 51 of suitable material for which I have found natural uncured rubber to be satisfactory. This acts as a seal during the initial motion of the plunger to crush the ampule 52. Electrolyte from the crushed ampule flows up and into the cells 53 of the battery, after which continued motion of the plunger carries the sealing collar 51 across the openings 54 to seal them off as before. Annular ledge 56 is provided so that the sealing collar is squeezed when the plunger is fully seated, to expand the sealing material into the openings 54 to completely seal same. The bottom of ledge 56 may be rounded to minimize interference with flow of electrolyte into the cells. If desired, ledge 56 may be slotted as shown in FIG. 5 to act as a strainer, in which case its inner edge may be extended nearly to plunger 50.

While I have shown and described the principles of my invention in connection with specific embodiments, it is apparent that various further modifications may be made without departing from the invention, and it is intended to cover in the appended claims all such changes and modifications as fall within the scope of the invention.

I claim:

1. A reserve battery comprising a cell, spaced electrodes in said cell, a filling aperture in said cell, a frangible sealed ampule containing electrolyte, a plunger adjacent said ampule, a conduit between said ampule and said cell aperture, a body of sealing material, and means for moving said plunger into contact with said ampule to crush same and force electrolyte through said conduit and aperture into said cell, said means being so constructed and arranged that upon further motion of said plunger the body of sealing material is disposed across the aperture to seal same.

2. A reserve battery comprising a cell, spaced electrodes in said cell, a filling aperture in said cell, a frangible sealed ampule containing electrolyte, a chamber containing said ampule and communicating with said cell aperture, a plunger sealing said chamber and axially movable therein to crush said ampule and force electrolyte therefrom through said aperture into the cell, and a body of sealing material movable by continued motion of said plunger to seal said aperture.

* * * * *